Ensinger & Fertig,
Bread Cutter.
No. 98,576.      Patented Jan. 4, 1870.
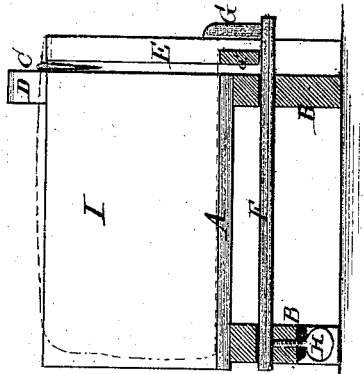
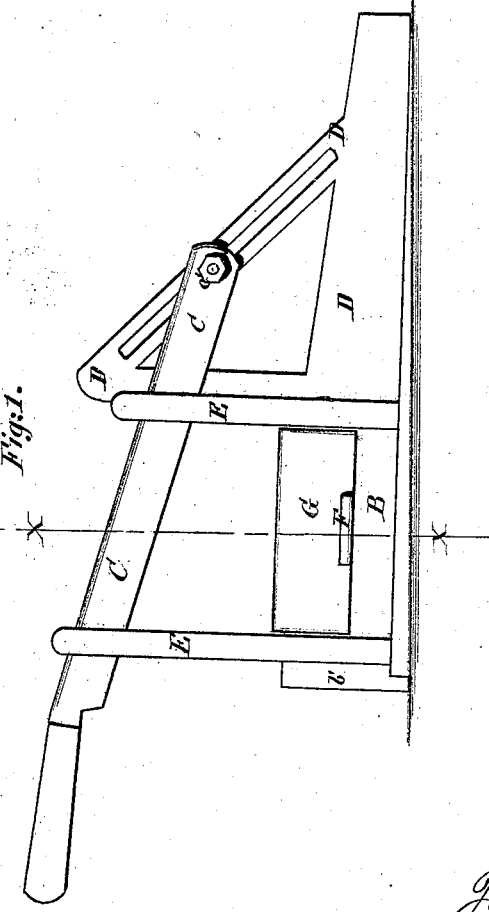
Witnesses:
M. Vorlander
Alex F. Roberts
Inventor:
Jacob Ensinger
Lewis Fertig
per
Mmmm
Attorneys.

United States Patent Office.

JACOB ENSINGER AND LEWIS FERTIG, OF DAUPHIN, PENNSYLVANIA.

Letters Patent No. 98,576, dated January 4, 1870.

IMPROVED BREAD AND MEAT-SLICER.

The Schedule referred to in these Letters Patent and making part of the same

*To all whom it may concern:*

Be it known that we, JACOB ENSINGER and LEWIS FERTIG, of Dauphin, in the county of Dauphin, and State of Pennsylvania, have invented a new and useful Improvement in Bread and Meat-Slicer; and we do hereby declare that the following is a full, clear, and exact description thereof, which will enable others skilled in the art to make and use the same, reference being had to the accompanying drawings, forming part of this specification, in which—

Figure 1 is a front view of our improved machine.

Figure 2 is a detail sectional view of the same, taken through the line x x, fig. 1.

Similar letters of reference indicate corresponding parts.

Our invention has for its object to furnish a simple and convenient machine, by means of which bread and other soft, spongy substances may be sliced evenly and uniformly, and which may be used with equal advantage for slicing dried beef and other hard substances; and It consists in the construction and combination of the various parts of the machine, as hereinafter more fully described.

A is the platform or bottom board of the machine, which rests upon and is attached to the feet, or a foundation-frame, B, the end-board b' of which projects, as shown in fig. 1, so as to hold the machine firm, when standing upon a flat surface.

C is the knife, the forward end of which has a guide-pin or bolt, c', attached to it, which passes through and works in an inclined guide-slot in the frame D.

The pin or bolt c' should have a friction-roller placed upon it, to diminish the friction as it moves up and down the slotted guide D.

The knife C also passes through and works in vertical slots E, formed in or attached to the forward end of the machine, as shown in figs. 1 and 2.

The guide-slots D and E compel the knife C, as it is operated, to act upon the substance being cut, with a drawing-cut, so as to cut the substance evenly and smoothly, whether it be soft and spongy or dry and hard.

The vertical slot E, in which the knife C works, extends down through the end, or at the end of the bottom board A.

a' is a strip attached to the frame, that forms the slot E, the upper surface of which is even with the bottom-board A, so as to support the forward end of the bread or meat while being cut.

F is a bar, sliding in a socket in the base frame B, and to the forward end of which is attached an upwardly-projecting board G, against which the forward end of the bread or meat being sliced may rest, to gauge the thickness of the slices being cut.

The gauge F G is held securely in place, when adjusted by the set-screw H, as shown in fig. 2.

To one edge of the bottom board A is attached an upwardly-projecting board I, against which the bread or meat being sliced is held, so that it may be held steady while being sliced.

We do not desire to claim broadly giving a draw-cut to a slicing-knife, as we are aware that this is old; but What we do esteem to be of our invention, and desire to protect by Letters Patent, is—

A bread-slicer, having the adjustable gauge F G H, side plate I, and guides D E, constructed and arranged, with reference to the knife, as shown and described.

JACOB ENSINGER.
LEWIS FERTIG.

Witnesses:
MICHEL MISENHETTE,
JOHN H. PORTER.